United States Patent
Seydell et al.

(10) Patent No.: US 11,938,790 B2
(45) Date of Patent: Mar. 26, 2024

(54) VENTILATION OUTLET, VENTILATION SYSTEM AND MOTOR VEHICLE

(71) Applicant: Volkswagen Aktiengesellschaft, Wolfsburg (DE)

(72) Inventors: Bertram Seydell, Braunschweig (DE); Marcel Thomas, Magdeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 79 days.

(21) Appl. No.: 17/559,744

(22) Filed: Dec. 22, 2021

(65) Prior Publication Data

US 2022/0194177 A1 Jun. 23, 2022

(30) Foreign Application Priority Data

Dec. 23, 2020 (DE) ................... 10 2020 216 529.7

(51) Int. Cl.
*B60H 1/34* (2006.01)

(52) U.S. Cl.
CPC ................................. *B60H 1/3421* (2013.01)

(58) Field of Classification Search
CPC ...... B60H 1/34; B60H 1/3414; B60H 1/3421; B60H 1/3428; B60H 1/345; B60H 2001/3464–3478
See application file for complete search history.

(56) References Cited

U.S. PATENT DOCUMENTS

| | | | |
|---|---|---|---|
| 6,340,328 B1 * | 1/2002 | Schwandt | B60H 1/345 454/155 |
| 8,662,970 B2 | 3/2014 | Nagasaka et al. | |
| 10,500,926 B2 | 12/2019 | Freese et al. | |
| 2013/0029577 A1 | 1/2013 | Kim | |
| 2016/0361978 A1 | 12/2016 | Groschopf | |
| 2017/0120723 A1 * | 5/2017 | Sura | B60H 1/00764 |
| 2021/0107337 A1 | 4/2021 | Othmer | |
| 2021/0260969 A1 * | 8/2021 | Kim | B60H 1/3421 |

(Continued)

FOREIGN PATENT DOCUMENTS

| | | |
|---|---|---|
| DE | 10063189 A1 | 6/2002 |
| DE | 102007014103 A1 | 9/2008 |
| DE | 112011100213 T5 | 10/2012 |

(Continued)

*Primary Examiner* — Edelmira Bosques
*Assistant Examiner* — Michael James Giordano
(74) *Attorney, Agent, or Firm* — Muncy, Geissler, Olds & Lowe, P.C.

(57) ABSTRACT

A ventilation outlet for a ventilation system of a motor vehicle for directionally supplying a passenger compartment of the motor vehicle with an air flow flowing in a flow direction, having a ventilation duct for passing the air flow, with a duct wall for circumferentially delimiting the ventilation duct and a ventilation duct outlet opening for discharging the air flow into the passenger compartment, and a first air guide louver arranged in the ventilation duct and having a louver head portion and a louver head portion for deflecting the air flow, wherein the first air guide louver is held pivotably relative to the ventilation duct about a pivot axis between a first position and a second position, wherein the pivot axis runs through the louver head portion and is arranged adjacent to the ventilation duct outlet opening.

11 Claims, 3 Drawing Sheets

(56) References Cited

U.S. PATENT DOCUMENTS

2022/0080810 A1* 3/2022 Bui .................. B60H 1/3435

FOREIGN PATENT DOCUMENTS

| | | |
|---|---|---|
| DE | 102016003030 A1 | 9/2017 |
| DE | 102018203076 A1 | 9/2019 |
| DE | 102019000031 A1 | 1/2020 |
| JP | S62228833 A | 10/1987 |
| JP | H06159784 A | 6/1994 |
| JP | 2005212746 A | 8/2005 |
| JP | 2013006587 A | 1/2013 |
| JP | 2014206337 A | 10/2014 |
| WO | WO2019166261 A1 | 9/2019 |

* cited by examiner

VENTILATION OUTLET, VENTILATION SYSTEM AND MOTOR VEHICLE

This nonprovisional application claims priority under 35 U.S.C. § 119(a) to German Patent Application No. 10 2020 216 529.7, which was filed in Germany on Dec. 23, 2020, and which is herein incorporated by reference.

BACKGROUND OF THE INVENTION

Field of the Invention

The present invention relates to a ventilation outlet for a ventilation system of a motor vehicle for directionally supplying a passenger compartment of the motor vehicle with an air flow flowing in a flow direction. Furthermore, the invention relates to a ventilation system for a motor vehicle for ventilating a passenger compartment of the motor vehicle with an air flow, and to a motor vehicle having a generic ventilation system.

Description of the Background Art

Ventilation systems for motor vehicles are known in which air can flow through a ventilation duct and be directed in a desired flow direction by means of a ventilation outlet. Many different ventilation outlets for ventilation systems are known, which differ in their basic principle, their tasks, and their functions. For example, there are ventilation outlets that have rigid air guide louvers via which the air flow can be guided in a constant direction. Ventilation outlets of this type are used, for example, to direct the air flow at vehicle windows, since the relative position of the windowpane to the ventilation outlet is constant and thus variable deflection of the air flow is not required. Other ventilation outlets, which are provided in particular for directing the air flow in the direction of the occupants of the motor vehicle, are also referred to as "passenger vents" and feature an adjustable deflection device for variable deflection of the air flow. Such a deflection device may, for example, have adjustable or pivotable louvers.

DE 10 2018 203 076 A1, which corresponds to US 2021/0107337, which is incorporated herein by reference, describes a ventilation outlet with a ventilation duct which is divided into two separate partial ventilation ducts towards the passenger compartment. By means of an air guide louver, an air flow flowing through the ventilation duct towards the partial ventilation ducts can be divided into individual air flows. At an end of the ventilation outlet facing the passenger compartment, the partial ventilation ducts are brought together again. The direction of flow of the resulting total air flow can be influenced by the strength of the individual air flows.

DE 10 2007 014 103 A1 discloses a ventilation duct with a ventilation outlet that has a plurality of jointly adjustable air guide louvers. A lower air guide louver contacts a duct wall of the ventilation duct via a sliding shoe. In this way, air flow below the lower air guide louver is prevented. WO 2019/166261 discloses a ventilation outlet with two horizontally pivotable air guide louvers, the pivot axes of which are arranged at an air outlet of the ventilation outlet.

Some of the known ventilation outlets have the disadvantage that in some cases, with some positions of the air guide louvers, unintentional contact of the air flow with an outer contour of the ventilation outlet can occur. This causes the air flow to be deflected in a direction other than the intended direction.

SUMMARY OF THE INVENTION

It is therefore an object of the present invention to remedy or at least partially remedy the above-described disadvantages in a ventilation outlet. In particular, it is the object of the present invention to create a ventilation outlet for a ventilation system of a motor vehicle for directionally supplying a passenger compartment of the motor vehicle with an air flow flowing in a flow direction, a ventilation system for a motor vehicle, and a motor vehicle with a ventilation system, which avoid or at least reduce in a simple and inexpensive manner an unintentional contact of the air flow with the outer contour of the ventilation outlet.

The foregoing object is achieved by the subject-matter according to the claims. Accordingly, the object is achieved by a ventilation outlet for a ventilation system of a motor vehicle, by a ventilation system for a motor vehicle, and by a motor vehicle. Further features and details of the invention result from the dependent claims, the description, and the drawings. Features and details described in connection with the ventilation outlet according to the invention naturally also apply in connection with the ventilation system according to the invention and the motor vehicle according to the invention, and vice versa in each case, so that reference is or can always be made mutually with regard to the disclosure concerning the individual aspects of the invention.

According to a first example of the invention, the object is achieved by a ventilation outlet for a ventilation system of a motor vehicle for directionally supplying a passenger compartment of the motor vehicle with an air flow flowing in a flow direction. The ventilation outlet comprises a ventilation duct for passing the air flow therethrough, having a duct wall for circumferentially delimiting the ventilation duct and a ventilation duct outlet opening for discharging the air flow into the passenger compartment, and further comprising a first air guide louver arranged in the ventilation duct and having a louver head portion and a louver body portion for deflecting the air flow. The first air guide louver is held pivotable relative to the ventilation duct about a pivot axis between a first position and a second position, wherein the pivot axis extends through the louver head portion and is arranged adjacent to the ventilation duct outlet opening. In accordance with the invention, the louver head portion is configured to form a gap having a first gap width or no gap (that is, a gap having a first gap width of zero) in the first position of the first air guide louver in cooperation with a first wall section of the duct wall, and to form a gap for passing a secondary air flow having a second gap width in the second position of the first air guide louver in cooperation with the first wall section of the duct wall, wherein the first gap width is less than the second gap width.

The ventilation duct can be circumferentially delimited by the duct wall and is designed to pass the air flow. The ventilation duct outlet opening is formed by the duct wall and, according to the invention, can be designed as a nozzle and/or diffuser or the like. Preferably, the ventilation duct outlet opening is configured to promote a breakaway of the air flow from the duct wall at the duct outlet opening. Further preferably, the ventilation duct outlet opening is designed to avoid the formation of turbulence.

The first air guide louver can be designed to deflect the air flow and has the louver head portion and the louver body portion. The louver body portion is arranged upstream of the louver head portion in the direction of flow. Preferably, the louver body portion extends over at least 70%, preferably over at least 80%, of the length of the air guide louver. The louver head portion is mounted so as to be pivotable about the pivot axis relative to the ventilation duct. Here, the louver head portion is pivotable at least between the first position and the second position, which is different from the first position. The first air guide louver is preferably designed for pivoting by means of an electric actuator and/or for manual pivoting. The pivot axis preferably runs horizontally.

The first position is characterized in that a gap having the first gap width or no gap (that is, in other words, a gap having the first gap width of zero) can be formed between the louver head portion and the first wall section. Preferably, the first gap width is between 0 mm and 1 mm, in particular about 0.5 mm. Accordingly, the first gap width is preferably formed in such a way that no secondary air flow or only a negligibly small secondary air flow passes through the gap.

The second position is characterized in that a gap with the second gap width is formed between the louver head portion and the first wall section. The second gap width is preferably more than 2 mm, in particular between 2 mm and 5 mm, particularly preferably about 3 mm. Accordingly, the second gap width is preferably formed in such a way that such a secondary air flow flows through the gap, which is designed to detach the air flow from the duct wall in the region of the ventilation duct outlet opening. Herein lies a significant difference between the ventilation outlet according to the invention and ventilation outlets according to the prior art. By means of the secondary air flow of the ventilation outlet according to the invention, an air cushion effect can be generated, which prevents or at least considerably reduces the contact of the air flow with the duct wall in the region of the ventilation duct outlet opening. Accordingly, it is a matter of preventing an unintentional deflection of the air flow by the secondary air flow. Active deflection by means of the secondary air flow thus does not take place. In prior art ventilation outlets, deflection air flows are provided which actively deflect a main air flow due to their high flow energy, especially in a condition in which contact of the air flow with the duct wall does not occur even without the deflection air flow.

In intermediate positions between the first position and the second position, a gap is also formed between the louver head portion and the first wall section. A gap width in the intermediate positions is preferably greater than the first gap width and less than or equal to the second gap width. Preferably, the first air guide louver is formed such that the gap width increases continuously when moving from the first position to the second position, in particular in proportion to the pivoting movement. According to the invention, it can be provided that the first air guide louver can be moved from the first position across the second position into a third position. According to the invention, a third gap width in the third position can be less than the second gap width.

Compared to conventional ventilation outlets, a ventilation outlet according to the invention has the advantage that an air flow flowing through the ventilation duct can be deflected even more precisely than with conventional ventilation outlets by simple means and in a cost-effective manner. Such a secondary air flow can flow through the gap formed in the second position, which prevents the air flow from contacting the duct wall in the area of the ventilation duct outlet opening or detaches the air flow from the duct wall in the area of the ventilation duct outlet opening. A sudden increase in the deflection of the air flow when adjusting the first air guide louver can thus be prevented, so that setting a desired flow direction is improved for the operator of the ventilation outlet.

It can be provided in a ventilation outlet that the louver head portion can be formed such that the first gap width is between 0.3 mm and 0.7 mm. Particularly preferably, the first gap width is about 0.5 mm. Further preferably, the first air guide louver is designed and arranged to guide the air flow in the first position at an angle of between 80° and 100° relative to the gap. This has the advantage that in the first position, the secondary air flow can be limited by simple means and in a cost-effective manner in such a way that the secondary air flow has only a negligible effect on the air flow.

The louver head portion can be formed in such a way that the second gap width is between 2 mm and 5 mm. Particularly preferably, the second gap width is about 3 mm. Further preferably, the first air guide louver is designed and arranged to guide the air flow in the second position at an angle between 30° and 70° relative to a cross-sectional area of the gap. This has the advantage that such a secondary air flow can be provided in the second position by simple means and in a cost-effective manner, by means of which it is possible to avoid the air flow contacting the duct wall in the region of the ventilation duct outlet opening in a particularly reliable manner.

More preferably, the first air guide louver is held on the duct wall so that it can be pivoted about the pivot axis. A pivot joint forming the pivot axis is thus preferably held on the duct wall. This has the advantage that the ventilation outlet can be manufactured by simple means and in a cost-effective manner. Furthermore, a ventilation outlet with a compact design can be provided in this way.

It can also be provided in a ventilation outlet that the ventilation outlet can have at least one second air guide louver, wherein the at least one second air guide louver is at a greater distance from the first wall section than the first air guide louver. The at least one second air guide louver is configured to deflect the air flow. Preferably, the at least one second air guide louver is held pivotable about a second pivot axis relative to the ventilation duct. Alternatively, the second air guide louver can also be of rigid design. The second pivot axis is preferably arranged parallel or transversely, in particular at right angles, to the first pivot axis. Particularly preferably, the ventilation outlet comprises a plurality of second air guide louvers. Thereby, the plurality of second air guide louvers are all preferably at a greater distance to the first wall section than the first air guide louver. In other words, the first air guide louver is formed as an outer air guide louver. For example, when there are a plurality of second air guide louvers, some of the second air guide louvers may be rigidly formed and the other second air guide louvers may be pivotally formed. Alternatively, the second air guide louvers may all be rigidly or pivotally formed. According to the invention, the duct wall can have a first wall section on two opposite sides, in the direct vicinity of which a first air guide louver is arranged in each case. The first air guide louver can be formed as a lower air guide louver or an upper air guide louver. The plurality of second air guide louvers are preferably coupled to one another for common, in particular similar, pivoting. This has the advantage that the air flow can be deflected by simple means and in a cost-effective manner, thus improving the directional air flow to the passenger compartment.

The first air guide louver and the at least one second air guide louver can be designed for simultaneous pivoting with different pivoting speeds and/or pivoting directions. In accordance with the invention, the pivoting movement of the first air guide louver can be coupled to the pivoting movement of the second air guide louver in such a way that a pivoting of the first air guide louver causes a pivoting of the second air guide louver and/or that a pivoting of the second air guide louver causes a pivoting of the first air guide louver. Alternatively, according to the invention, it can be provided that the pivoting speed and/or pivoting direction of the first air guide louver and the second air guide louver are completely decoupled from one another or are decoupled from one another at least in predetermined pivoting ranges. This means that the first air guide louver and the second air guide louver can preferably be pivoted independently of one another at least in the predetermined pivoting range. Particularly preferably, the first air guide louver is coupled to the at least one second air guide louver in such a way that in a critical pivoting range of the second air guide louver, in which without a secondary air flow there is a risk of the air flow contacting the duct wall in the region of the ventilation duct outlet opening, the first air guide louver is moved in the direction of the second position or is already arranged in the second position. This has the advantage that the secondary air flow can be provided in a particularly demand-oriented manner by simple means and in a cost-effective manner in order to prevent the air flow from contacting the duct wall. Directional introduction of the air flow into the passenger compartment can thus be improved.

The first air guide louver in the first position can be arranged parallel or at least substantially parallel to the longitudinal extension of the ventilation duct. Thus, in the first position, the first air guide louver is designed to guide the air flow directly out of the ventilation outlet—preferably without causing a deflection of the air flow. This has the advantage that with simple means as well as in a cost-efficient manner in the first position an influence of the air flow by the first air guide louver is particularly low.

The first air deflector louver in the second position can have an angle of incidence of between 30° and 60° to the longitudinal extent of the ventilation duct. In other words, the first air guide louver is preferably designed to deflect an air flow in the second position flowing through the ventilation duct by an angle of between 30° and 60°. Particularly preferably, in the second position, the first air guide louver has an angle of incidence of about 45° with respect to the longitudinal extent of the ventilation duct. In such a position, a partial flow of the air flow can be diverted by means of the first air guide louver and directed towards the gap. This has the advantage that a secondary air flow flowing through the gap can be provided by simple means and in a cost-effective manner by means of the first air guide louver in order to prevent the air flow from contacting the duct wall in the area of the ventilation duct outlet opening by means of the secondary air flow.

According to a second aspect of the invention, the object can be achieved by a ventilation system for a motor vehicle for ventilating a passenger compartment of the motor vehicle with an air flow. The ventilation system comprises a blower device for generating an air flow flowing in a flow direction. According to the invention, the ventilation system has a ventilation outlet for discharging the air flow into the passenger compartment.

The blower device can be fluidly coupled to the ventilation outlet. Preferably, the blower device is coupled in a fluid-communicating manner with an intake opening for drawing in fresh air. By means of the blower device, the air flow flowing through the ventilation duct can be generated. An air filter device for filtering the fresh air drawn in is preferably arranged between the intake opening and the blower device.

The ventilation system according to the invention has all the advantages which have already been described with respect to a ventilation outlet according to the first aspect of the invention. Accordingly, the ventilation system according to the invention has the advantage over conventional ventilation systems that an air flow flowing through the ventilation duct can be deflected even more precisely than in conventional ventilation systems by simple means as well as in a cost-effective manner. Such a secondary air flow can flow through the gap formed in the second position, which prevents the air flow from contacting the duct wall in the area of the ventilation duct outlet opening or detaches the air flow from the duct wall in the area of the ventilation duct outlet opening. A sudden increase in the deflection of the air flow when adjusting the first air guide louver can thus be prevented, so that setting a desired flow direction is improved for the operator of the ventilation system.

According to a third aspect of the invention, the object is achieved by a motor vehicle. The motor vehicle according to the invention comprises a ventilation system according to the invention for ventilating a passenger compartment of the motor vehicle with an air flow.

In the motor vehicle according to the invention, all the advantages already described with respect to a ventilation outlet according to the first aspect of the invention and with respect to a ventilation system according to the second aspect of the invention are obtained. Accordingly, the motor vehicle according to the invention has the advantage over conventional motor vehicles that an air flow flowing through the ventilation duct can be deflected even more precisely by simple means as well as in a cost-effective manner than in motor vehicles with conventional ventilation systems. Such a secondary air flow can flow through the gap formed in the second position, which prevents the air flow from contacting the duct wall in the region of the ventilation duct outlet opening or detaches the air flow from the duct wall in the region of the ventilation duct outlet opening. A sudden increase in the deflection of the air flow when adjusting the first air guide louver can thus be prevented, so that setting a desired flow direction is improved for the operator of the ventilation system of the motor vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
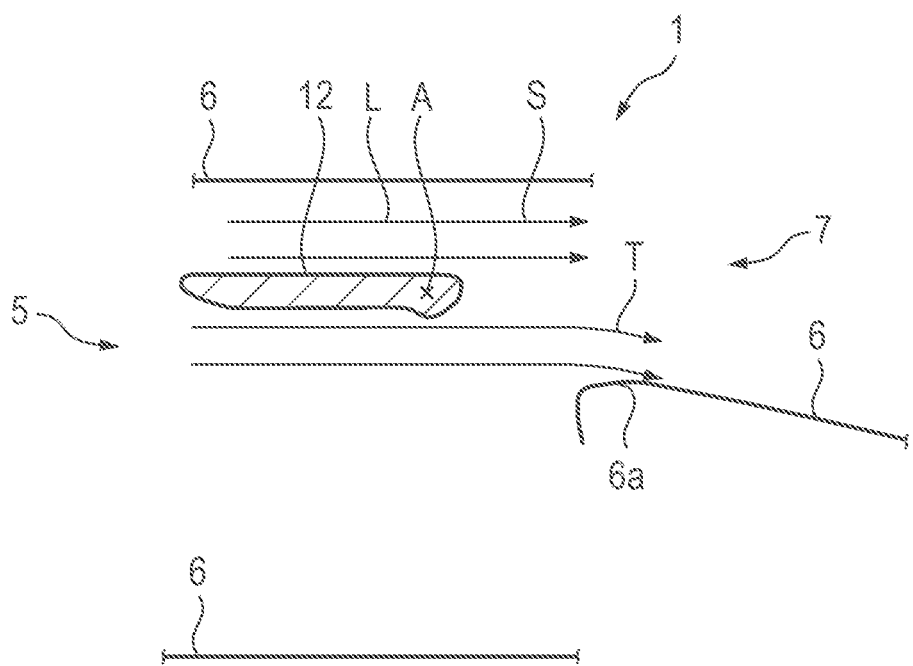
FIG. 1 is a sectional view of a ventilation outlet according to the prior art.

FIG. 1 schematically shows a ventilation outlet 1 according to the state of the art in a sectional view. The ventilation outlet 1 has a ventilation duct 5 formed by a duct wall 6 with a ventilation duct outlet opening 7. A second air guide louver 12 is arranged in the ventilation duct 5 for diverting an air flow L flowing through the ventilation duct 5. The second air guide louver 12 is mounted so as to be pivotable about a pivot axis A. In the illustrated position of the second air guide louver 12, the air flow L flows predominantly in a horizontal flow direction S. In the region of a first wall section 6a at the ventilation duct outlet opening 7, a partial air flow T of the air flow L rests against the duct wall 6 and is thus deflected from the rest of the air flow L in an undesirable manner.

Figure 2:
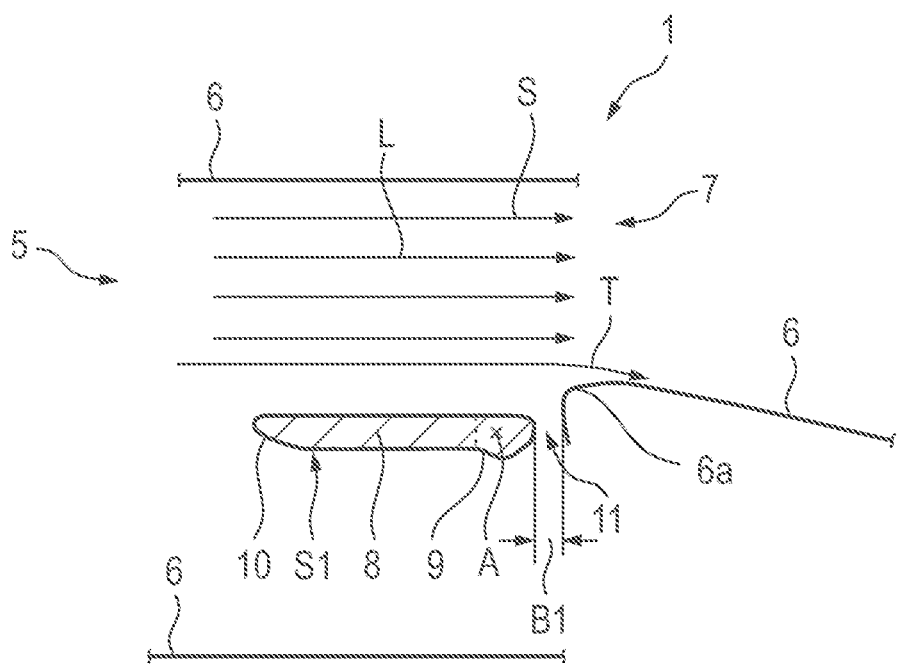
FIG. 2 is a sectional view of a ventilation outlet according to an exemplary embodiment of the invention in a first position.

FIG. 2 schematically shows a ventilation outlet 1 according to a preferred first embodiment of the invention in a first position S1 in a sectional view. The ventilation outlet 1 has a ventilation duct 5 formed by a duct wall 6 with a ventilation duct outlet opening 7. A first air guide louver 8 is arranged in the ventilation duct 5 for deflecting an air flow L flowing through the ventilation duct 5. The first air guide louver 8 has an asymmetrically shaped louver head portion 9 and a louver body portion 10 and is pivotally mounted about a pivot axis A extending through the louver head portion 9. In this figure, the first air guide louver 8 is arranged in a first position S1, in which the air flow L flows in a horizontal flow direction S. The louver head portion 9 is arranged adjacent to a first wall section 6a of the duct wall 6. In the first position S1, a gap 11 with a first gap width B1 is formed between the louver head portion 9 and the first wall section 6a. In the region of the first wall section 6a at the ventilation duct outlet opening 7, a partial air flow T of the air flow L rests against the duct wall 6 and is thus deflected from the remaining air flow L in an undesirable manner.

Figure 3:
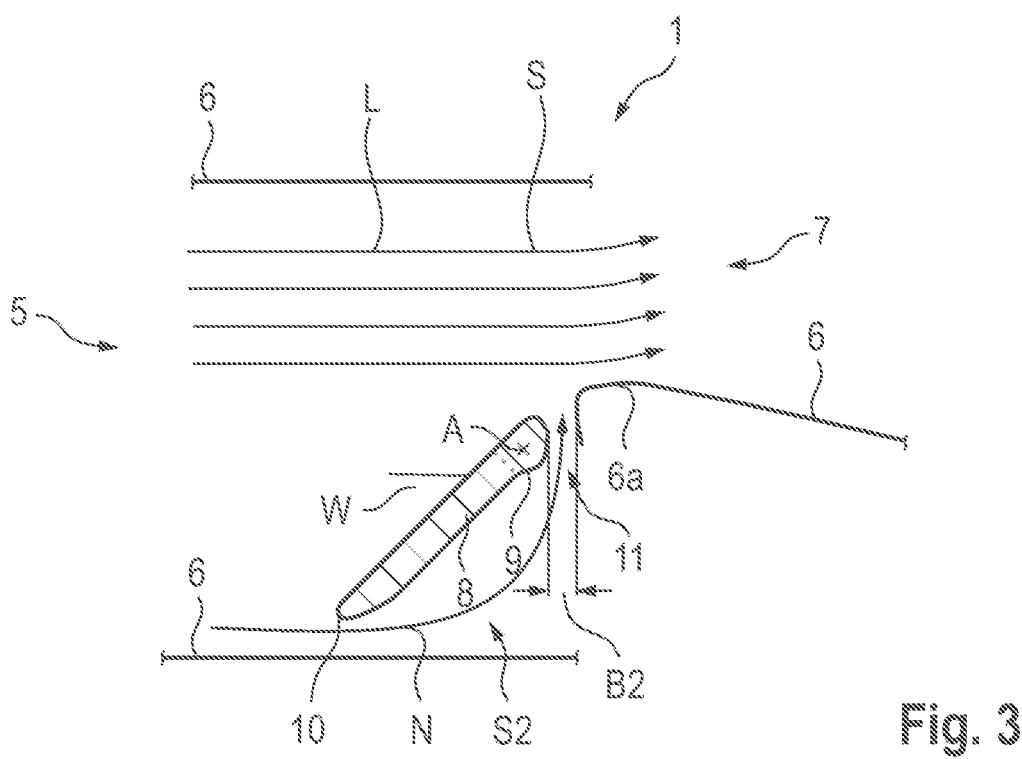
FIG. 3 is a sectional view of the ventilation outlet of FIG. 2 in a second position.

In FIG. 3, the ventilation outlet 1 from FIG. 2 is shown schematically in a second position S2 in a sectional view. In the second position S2, the first air guide louver 8 is pivoted about the pivot axis A in such a way that the first air guide louver 8 has an angle of incidence W with respect to the longitudinal extent of the ventilation duct 5. Due to the formation of the louver head portion 9, a gap 11 with a second gap width B2 is formed in the second position S2 between the louver head portion 9 and the first wall section 6a of the duct wall 6, wherein the second gap width B2 is greater than the first gap width B1. Due to the alignment of the first air guide louver 8 with respect to the air flow L and the size of the second gap width B2, a secondary air flow N flows through the gap 11. The secondary air flow N is weak in relation to the air flow L and prevents the air flow L or at least partial air flow T (cf. FIG. 2) from contacting the duct wall 6 in the region of the first wall section 6a at the ventilation duct outlet opening 7.

Figure 4:
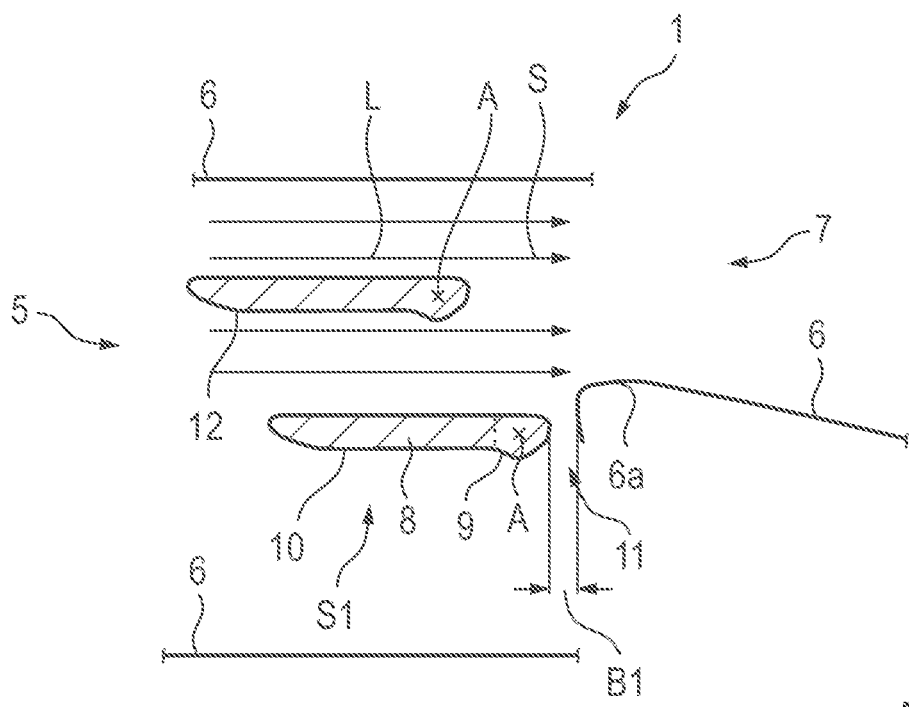
FIG. 4 is a sectional view of a ventilation outlet according to an exemplary embodiment of the invention in a first position.

FIG. 4 shows a ventilation outlet 1 according to a preferred second embodiment of the invention in the first position S1 schematically in a sectional view. The ventilation outlet 1 according to the preferred second embodiment of the invention differs from the ventilation outlet 1 according to the preferred first embodiment of the invention shown in FIG. 2 and FIG. 3 in an additional second air guide louver 12, which is arranged in the interior of the ventilation duct 5 and is mounted so as to be pivotable about a pivot axis A. By means of the first air guide louver 8 and second air guide louver 12, a more precise deflection of the air flow L is ensured.

Figure 5:
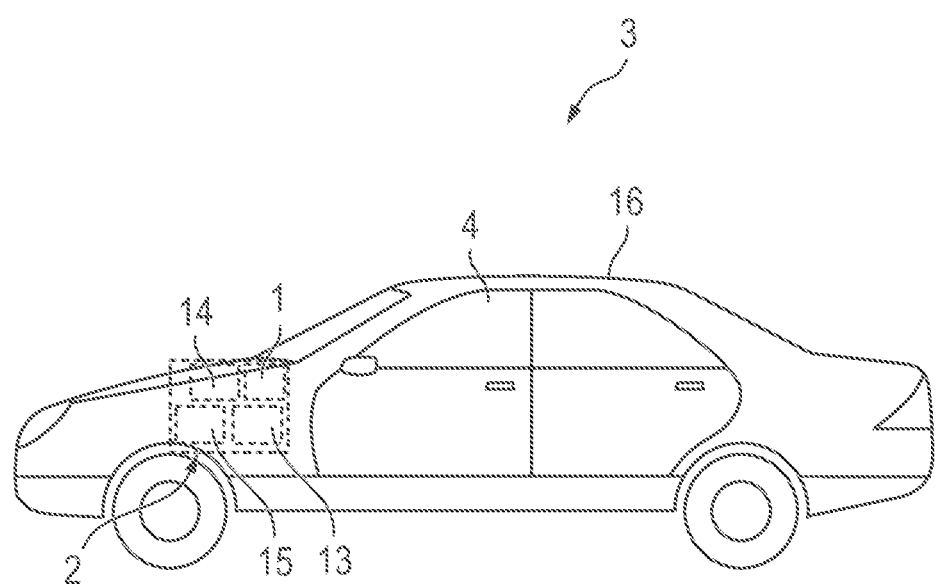
FIG. 5 is a side view of a motor vehicle according to an exemplary embodiment of the invention.

FIG. 5 illustrates a motor vehicle 3 according to a preferred embodiment of the invention schematically in a side view. The motor vehicle 3 has a passenger compartment 4 surrounded by a body 16. Furthermore, the motor vehicle 3 has a ventilation system 2 according to the invention with an air inlet 14 for admitting fresh air, a filter device 15 for filtering the fresh air, a blower device 13 for generating the air flow L and a ventilation outlet 1 according to the invention for directionally supplying the passenger compartment 4 with an air flow L flowing in a flow direction S.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A ventilation outlet for a ventilation system of a motor vehicle for directionally supplying a passenger compartment of the motor vehicle with an air flow flowing in a flow direction, the ventilation outlet comprising:
   a ventilation duct to pass the air flow;
   a duct wall to circumferentially delimit the ventilation duct;
   a ventilation duct outlet opening to discharge the air flow into the passenger compartment; and
   a first air guide louver arranged in the ventilation duct, the first air guide louver having a louver head portion and a louver body portion for deflecting the air flow,
   wherein the first air guide louver is held pivotably relative to the ventilation duct about a pivot axis between a first position and a second position,
   wherein the pivot axis runs through the louver head portion and is arranged adjacent to the ventilation duct outlet opening,
   wherein, in the first position of the first air guide louver, the louver head portion forms a gap with a first gap width or no gap in cooperation with a first wall section of the duct wall, and in the second position of the first air guide louver, the louver head portion forms a gap with a second gap width in cooperation with the first wall section of the duct wall for passing a secondary air flow,
   wherein the first gap width is less than the second gap width,
   wherein the louver head portion has an asymmetrical shape to provide the first gap width and second gap width that differ from one another when the first air guide louver is in the first position and in the second position, and
   wherein, in the first position, the first air guide louver is arranged parallel to or at least substantially parallel to a longitudinal extension of the ventilation duct.

2. The ventilation outlet according to claim 1, wherein the louver head portion is formed such that the first gap width is between 0.3 mm and 0.7 mm.

3. The ventilation outlet according to claim 1, wherein the louver head portion is formed such that the second gap width is between 2 mm and 5 mm.

4. The ventilation outlet according to claim 1, wherein the first air guide louver is held on the duct wall so as to be pivotable about the pivot axis.

5. The ventilation outlet according to claim 1, wherein the ventilation outlet has at least one second air guide louver, and wherein the at least one second air guide louver is at a greater distance from the first wall section than the first air guide louver.

6. The ventilation outlet according to claim 5, wherein the first air guide louver and the at least one second air guide louver are designed for simultaneous pivoting with different pivoting speeds and/or pivoting directions.

7. A ventilation outlet for a ventilation system of a motor vehicle for directionally supplying a passenger compartment of the motor vehicle with an air flow flowing in a flow direction, the ventilation outlet comprising:
a ventilation duct to pass the air flow;
a duct wall to circumferentially delimit the ventilation duct;
a ventilation duct outlet opening to discharge the air flow into the passenger compartment; and
a first air guide louver arranged in the ventilation duct, the first air guide louver having a louver head portion and a louver body portion for deflecting the air flow,
wherein the first air guide louver is held pivotably relative to the ventilation duct about a pivot axis between a first position and a second position,
wherein the pivot axis runs through the louver head portion and is arranged adjacent to the ventilation duct outlet opening,
wherein, in the first position of the first air guide louver, the louver head portion forms a gap with a first gap width or no gap in cooperation with a first wall section of the duct wall, and in the second position of the first air guide louver, the louver head portion forms a gap with a second gap width in cooperation with the first wall section of the duct wall for passing a secondary air flow,
wherein the first gap width is less than the second gap width,
wherein the louver head portion has an asymmetrical shape to provide the first gap width and second gap width that differ from one another when the first air guide louver is in the first position and in the second position, and
wherein, in the second position, the first air guide louver has an angle of incidence of between 30° and 60° with respect to a longitudinal extent of the ventilation duct.

8. A ventilation system for a motor vehicle for ventilating a passenger compartment of the motor vehicle with an air flow, the ventilation system comprising:
a blower device for generating an air flow flowing in a flow direction; and
the ventilation outlet according to claim 1 for discharging the air flow into the passenger compartment.

9. A motor vehicle comprising:
a ventilation system for ventilating a passenger compartment of the motor vehicle with an air flow, wherein the ventilation system is the ventilation system according to claim 8.

10. The ventilation outlet according to claim 1, wherein in the first position and the second position, the pivot axis remains in a fixed position with respect to the ventilation duct.

11. A ventilation outlet for a ventilation system of a motor vehicle for directionally supplying a passenger compartment of the motor vehicle with an air flow flowing in a flow direction, the ventilation outlet comprising:
a ventilation duct to pass the air flow;
a duct wall to circumferentially delimit the ventilation duct;
a ventilation duct outlet opening to discharge the air flow into the passenger compartment; and
a first air guide louver arranged in the ventilation duct, the first air guide louver having a louver head portion and a louver body portion for deflecting the air flow,
wherein the first air guide louver is held pivotably relative to the ventilation duct about a pivot axis between a first position and a second position,
wherein the pivot axis runs through the louver head portion and is arranged adjacent to the ventilation duct outlet opening,
wherein, in the first position of the first air guide louver, the louver head portion forms a gap with a first gap width or no gap in cooperation with a first wall section of the duct wall, and in the second position of the first air guide louver, the louver head portion forms a gap with a second gap width in cooperation with the first wall section of the duct wall for passing a secondary air flow,
wherein the first gap width is less than the second gap width,
wherein the louver head portion has an asymmetrical shape to provide the first gap width and second gap width that differ from one another when the first air guide louver is in the first position and in the second position, and
wherein the louver head portion is positioned downstream of the louver body portion in a flow direction.

* * * * *